United States Patent
Wu et al.

(10) Patent No.: US 11,198,615 B2
(45) Date of Patent: Dec. 14, 2021

(54) METHOD OF PRETREATMENT AND BROMINE RECOVERY OF PCB INCINERATION ASH

(71) Applicant: Beijing University of Technology, Beijing (CN)

(72) Inventors: Yufeng Wu, Beijing (CN); Dean Pan, Beijing (CN); Bin Li, Beijing (CN); Tieyong Zuo, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 204 days.

(21) Appl. No.: 16/348,506

(22) PCT Filed: Dec. 21, 2018

(86) PCT No.: PCT/CN2018/122612
§ 371 (c)(1),
(2) Date: May 9, 2019

(87) PCT Pub. No.: WO2019/128862
PCT Pub. Date: Jul. 4, 2019

(65) Prior Publication Data
US 2020/0262712 A1    Aug. 20, 2020

(30) Foreign Application Priority Data

Dec. 30, 2017    (CN) .......................... 201711490199.0

(51) Int. Cl.
*C01G 3/00*    (2006.01)
*C01G 3/10*    (2006.01)
(Continued)

(52) U.S. Cl.
CPC ............... *C01G 3/003* (2013.01); *C01G 3/10* (2013.01); *C01G 9/06* (2013.01); *C01G 21/20* (2013.01);
(Continued)

(58) Field of Classification Search
CPC . C01G 3/003; C01G 3/10; C01G 9/06; C01G 21/20; C22B 7/007; C22B 7/008;
(Continued)

(56) References Cited

FOREIGN PATENT DOCUMENTS

| CN | 102011008 A | * | 4/2011 |
| CN | 105755289 A | | 7/2016 |

(Continued)

*Primary Examiner* — Melissa S Swain
(74) *Attorney, Agent, or Firm* — Leonid Kisselev

(57) ABSTRACT

A method of pretreatment and bromine recovery of PCB Incineration ash is disclosed that relates to the field of comprehensive recovery of valuable metals by full wet method, especially relates to a method of valuable metals and bromine recovery, precious metals enrichment in pretreatment process of PCB Incineration ash. The major steps includes alkali leaching, Cu extraction back-extraction, neutralization-precipitation to separate, Bromine evaporative crystallization, regeneration, acid pickling, Zn evaporative crystallization, removal of Zn and Cu. Compared with the traditional comprehensive recovery process of ash, the invention can separate bromine from ash and recover valuable metals such as copper, zinc and lead with the maximum extent, at the same time, the enrichment of silver and other precious metals is beneficial to the subsequent recovery of precious metals. It has high added recovery value and no tailless discharge.

6 Claims, 4 Drawing Sheets

(51) Int. Cl.
| | |
|---|---|
| *C01G 9/06* | (2006.01) |
| *C01G 21/20* | (2006.01) |
| *C22B 7/00* | (2006.01) |
| *C22B 7/04* | (2006.01) |
| *C22B 3/00* | (2006.01) |
| *C22B 15/00* | (2006.01) |
| *C22B 19/30* | (2006.01) |

(52) U.S. Cl.
CPC .............. *C22B 7/007* (2013.01); *C22B 7/008* (2013.01); *C22B 7/04* (2013.01); *C22B 13/045* (2013.01); *C22B 15/0065* (2013.01); *C22B 19/30* (2013.01)

(58) Field of Classification Search
CPC ..... C22B 7/04; C22B 13/045; C22B 15/0065; C22B 19/30
USPC .......................................................... 423/24
See application file for complete search history.

(56) References Cited

FOREIGN PATENT DOCUMENTS

| CN | 106381392 A | 2/2017 |
|---|---|---|
| CN | 106591586 A | 4/2017 |
| CN | 106636656 A | 5/2017 |
| CN | 106755996 A | 5/2017 |
| CN | 108118157 A | 6/2018 |
| WO | WO2010149841 A1 | 12/2010 |

\* cited by examiner

METHOD OF PRETREATMENT AND BROMINE RECOVERY OF PCB INCINERATION ASH

CROSS REFERENCE TO RELATED APPLICATION

This application is a national stage application of International application number PCT/CN2018/122612, filed Dec. 21, 2018, titled "A Method of Pretreatment and Bromine Recovery of PCB Incineration Ash", which claims the priority benefit of Chinese Patent Application No. 201711490199.0, filed on Dec. 30, 2017, which is hereby incorporated by reference in its entirety.

TECHNICAL FIELD

The invention relates to the field of comprehensive recovery of valuable metals by fully wet ash method, in particular relates to a method for recovering valuable metals, precious metal enrichment and bromine recovery in the pretreatment process of circuit board incineration ash.

BACKGROUND

Circuit boards are an important part of electrical and electronic products and the basis of the modern electrical and electronic industry. The integrated circuit board is mainly a copper-clad laminate composed of electronic components, glass fiber reinforced epoxy resin, and many metal materials including precious metals. The waste circuit board (WPCB) contains a large number of valuable metals such as gold, silver and palladium, which are much higher in content than the original mineral deposits and have great recycling value. At the same time, WPCB has complex composition and contains many harmful substances such as heavy metals and brominated flame retardants. Traditional landfill and incineration methods would seriously damage the ecosystems. Therefore, WPCB has the dual attributes of resource and pollutant. The invention relates to the field of comprehensive recovery of valuable metals in ash by full wet method, in particular to the method for recovering valuable metals, precious metal enrichment and bromine recovery in the pretreatment process of circuit board incineration ash or incineration ash.

Due to the characteristics of the circuit board, it is easy to produce a variety of pollutants during the combustion process, as shown in the following table:

| Pollutants | Composition | Characteristics |
|---|---|---|
| Acidic gases | HBr, Br2, HCl, Cl2, NOx | corrosive |
| Incomplete incineration product | CO, Carbon black, hydrocarbon CO, Carbon black, hydrocarbon | Gas or solid state |
| Aromatic organic pollutants | Brominated dioxins (PBDD/FS), polybrominated biphenyls (PBBS), bromobenzene (PBBz) series, bromophenol (PBPh), polycyclic aromatic hydrocarbons (PAHs), etc. | Many homologues, varying toxicity, and some with high toxicity; difficult to detect; difficult to degrade |
| Fatty chain organic pollutant | Brominated hydrocarbons, aliphatic hydrocarbons | Gas state |
| Soot or Ash | Tin, antimony, zinc, lead, copper, gold and silver, etc. | Minute, difficult to dispose |

Many of these homologues of organic pollutants with aromatic rings are listed in the Chinese environmental priority pollutants blacklist and US EPA environment priority pollutants blacklist. Dioxins in particular are causing concerns in the academic, public, and government sectors.

In 2014, Guiyu Group adopted the internationally advanced and environmentally friendly molten pool smelting technology to process the application platform of used PCB. The successful implementation of this technology will help to fundamentally change the traditional incineration models, help reduce the environmental problems caused by the incineration of the flue gas generated by the circuit board, and also lay a solid technical foundation for the Guiyu group company to enter the urban mineral field, with good economic benefits, environmental benefits and long-term social benefits.

Based on the calculation from the demonstration line that processes 20,000 tons of waste circuit boards, which produces 10,886 $m^3$/h of flue gas. With the flue gas dust content of 5 $g/Nm^3$, the running time being 300 days, 24 hours a day, 20,000 tons of waste circuit boards will produce about 360 tons of soot a year. China's circuit board production is more than one million tons, and its circuit board incineration soot will be tens of thousands of tons, and the processing capacity is considerable. As mentioned in the above table, the soot contains iron, tin, antimony, zinc, lead, copper, gold and silver, etc., which has great recovery value, but at the same time, the complex types and quantities of impurity ions in the smelting process (such as halogen elements such as chlorine and bromine)) has brought adverse effects to recycling effort. The existing simple metal-recovery process cannot meet the comprehensive recycling requirements of circuit board incineration soot.

At present, there is no comprehensive recovery process of copper recovery from ash that is focused on PCB incineration ash. The existing processes are as follows:

(1) Pyrogenic Treatment

This method is mainly used in rotary kiln, reverberatory furnace and arc furnace, In general, volatile lead and zinc are volatilized and enriched under a reducing atmosphere, while other elements are reduced into copper ingots or lead ingots and returned to the smelting process. Returning to smelting not only reduces the treating capacity of raw materials in copper smelting but also increases the content of impurities in raw materials and reduces the capacity of furnace, moreover, the cycling accumulation of impurities such as Zn and As will directly affect the quality of the final electro-copper product.

There are some problems in the pyrogenic treatment method of copper recovery from ash, such as poor working conditions and low comprehensive recovery rate of valuable metals. At present, only small copper smelting enterprises use this method for simple recovery of ash. This method is gradually phased out under the increasingly environmental pressure.

(2) Semi-Wet Treatment

Semi-wet treatment of copper smelting ash is a combination of pyrogenic and wet process. It is also one of the main processes of copper smelting ash treatment. The major components of this method Includes the following:

Rotary kiln reduction and roasting—leaching process: in the rotary kiln reduction and roasting process, most of Zn, Pb and Cd can be volatilized and enriched into the secondary ash; Rotary kiln slag is sent to the corresponding copper process for copper recovery. This method reduces the load of pyrogenic process, reduces the accumulation effect of impurity ions such as Zn, Pb, and plays a positive role in improving the quality of electro-copper products. However, this method has the drawback of lacking secondary ash disposal and valuable metals cannot be completely recovered.

Sulfation roasting—leaching process: this process is mainly aimed at the recovery of As in ash. In the process of sulfation roasting, As can be volatilized in the form of $As_2O_3$ and then collected and recovered by the flue gas of rotary kiln. Cu and Zn are recovered by subsequent sulfuric acid leaching.

(3) Wet Treatment

The representative process for this method is the leaching-ammonium carbonate conversion method, which aims mainly at the recovery of lead. Copper smelting ash is first leached to produce zinc sulphate heptahydrate, the lead-rich leaching slag is subjected to a series of processes including conversion by ammonium carbonate, dissolution in nitric acid or silicic acid, and lead sulphate precipitation to obtain a first-grade product of tribasic lead sulfate. The method has the advantages of low pollution and low energy consumption.

In addition to the above method, the fully wet method also includes the alkali leaching method, pressure leaching-extraction process, ash leaching—alkali leaching of washed slag Pb/Bi process, ash leaching—water washing slag alkali leaching Pb/Bi process.

Due to the high content of copper, zinc, lead and bromine in PCB incineration ash, bromine and copper mainly exist in the form of double salt, simultaneous leaching of bromine by mixed alkali leaching is proposed to extract and separate bromine salt to the maximum extent. The leaching slag is similar to the traditional ash anode slime and can be used for recovery of valuable metals and enrichment of precious metals. For the enrichment of precious metals, Chinese patents CN106521169A and CN106521163A respectively carry out efficient enrichment of precious metals in leaching slag and leaching solution; at the same time, other valuable elements are recovered by high-value recycling. Starting with preferential separation and extraction of bromine salt, the present invention simultaneously separates and extracts valuable metals including copper, zinc and lead. The leaching slag thus obtained is further processed to enrich precious metals and to recover valuable metals by chlorination. This pretreatment and recovery process can realize the comprehensive recovery of valuable metals At the same time, the tail solution can be recycled without secondary waste water, thus the method has significant environmental and economic benefits.

SUMMARY

The main purpose of the invention is the recycling of valuable metals, precious metal enrichment, and bromine extraction in the PCB incineration ash. The has the advantages of high additional value recovery and non-tail liquid discharge.

The method of pretreatment and bromine recovery of PCB Incineration ash disclosed in the invention is as follows:

(1) Alkali leaching: PCB Incineration ash is subjected to a processes of alkali leaching, the alkali leaching solution is made of a mixture of sodium hydroxide and ammonia, wherein the concentration of sodium hydroxide is 5~20% by mass, and the concentration of ammonia is 5~20% by mass, the solid-liquid ratio of ash to the leaching solution is 1:5~1:10 Kg/L, the leaching temperature is 35~55° C.; blowing air with agitation, the blast air volume per cubic meter leaching solution is 0.01~0.1 m³/min, After leaching for 1 to 2 hours, stop blowing the air and continue agitating, 1~3 g copper powder is added into every liter of leaching solution, and the reaction is carried out for 10~30 minutes before filtration, after filtration a mixed alkali leaching slag and a mixed alkali leaching solution are obtained;

(2) Cu extraction back-extraction: the mixed alkali leaching solution obtained in step (1) is extracted with Benzaldehyde, 2-hydroxy-5-nonul-,oxime for copper extraction, copper sulfate and raffinate are obtained by back extraction with sulfuric acid solution;

(3) Neutralization-precipitation: sulfuric acid is added to the raffinate in step (2) for neutralization and precipitation, the terminal pH value of precipitation being 6~7, to obtain a precipitated slag and a precipitated solution;

(4) Bromine evaporative crystallization: bromine salts and crystal mother liquor are obtained by bromine evaporative crystallization of the precipitated solution in step (3);

(5) Regeneration: the crystal mother liquor in step (4) is regenerated by adding lime and adjusting pH to 11~12 to obtain gypsum and post-regeneration solution. The gypsum is put away to be treated concertedly, and the post-regeneration solution is returned to the alkali leaching process to form part of the mixed alkali leaching solution;

(6) Acid pickling: the precipitated slag in step (3) is acid washed with sulfuric acid, collecting the sulfuric acid wash solution, continue washing until the acid washing solution had a pH of 1~3 to obtain Lead sulfate and acid pickling solution;

(7) Zn evaporative crystallization: zinc sulfate and crystallized solution are obtained by Zn evaporative crystallization of the solution in step (6), the crystallized solution is returned to the acid pickling process as part of the acid washing solution (with the progress of crystallization, the acidity of the crystallized solution increases, which contains mainly sulfuric acid and can be used as the acid washing solution);

(8) Removal of Zn and Cu: the mixed alkali leaching slag in step (1) is used to remove zinc and copper, the leaching solution is 100~200 g/L sulfuric acid solution, the leaching temperature was 55~75° C. and the leaching time was 1~3 hours, hydrogen peroxide is added during leaching, and the mass of hydrogen peroxide added to per liter of the leaching solution is 40~80 g/L. Copper/zinc removal residual and copper/zinc removal filtrate are obtained. Separating copper and zinc from the copper/zinc removal filtrate to obtain copper sulfate and zinc sulfate, the copper/zinc removal residual is used for the enrichment of precious metals and recovery of valuable metals.

Compared with traditional comprehensive ash recovery processes, the invention can separate Bromine salt from ash and recover valuable metals such as copper, zinc and lead to the maximum extent, at the same time, silver and other precious metals is enriched to facilitate subsequent recovery. The method has high added recovery value and no tail liquid discharge.

DETAILED DESCRIPTION OF THE PREFERRED EMBODIMENTS

Embodiment I

Figure 1:
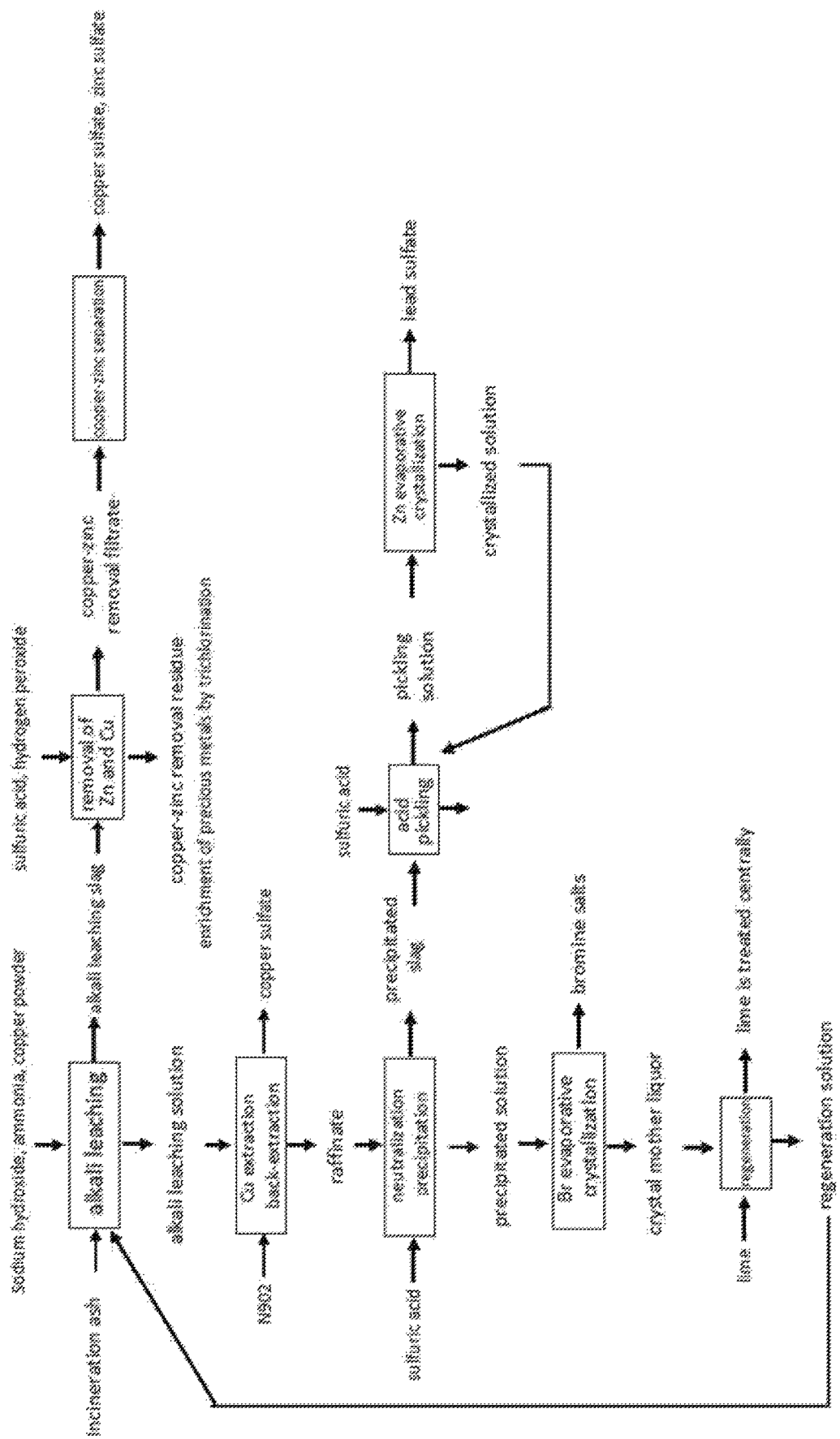
FIG. 1 is a flow chart of a method of pretreatment and bromine recovery of PCB incineration ash, according to one embodiment.
Figure 2:
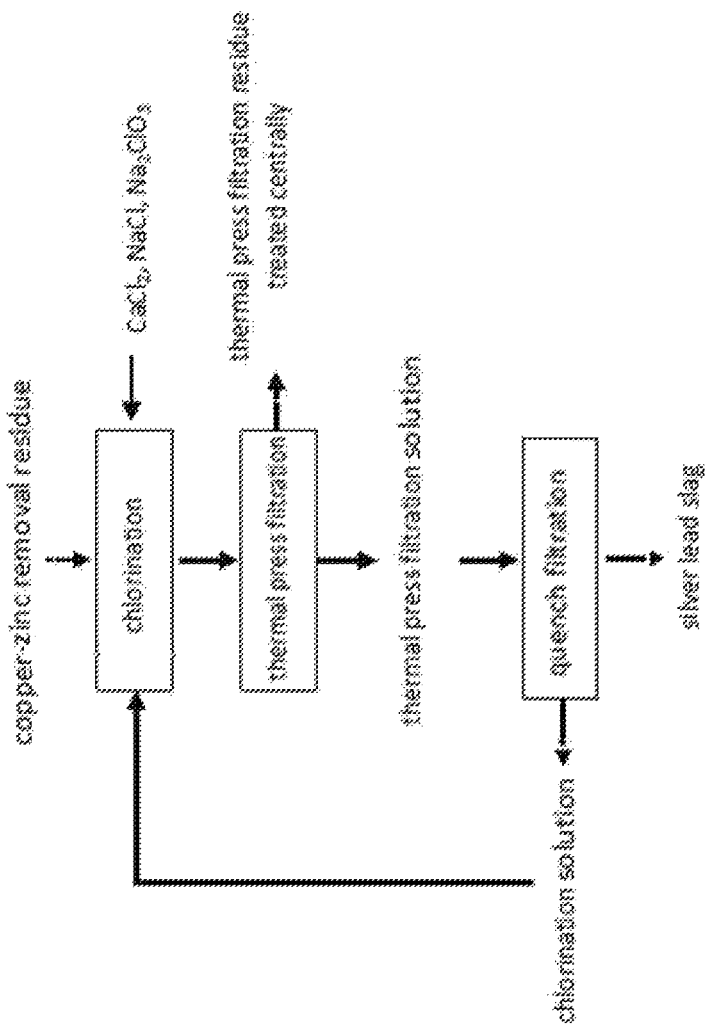
FIG. 2 is a flow chart of the trichloride method, according to one embodiment.
Figure 3:
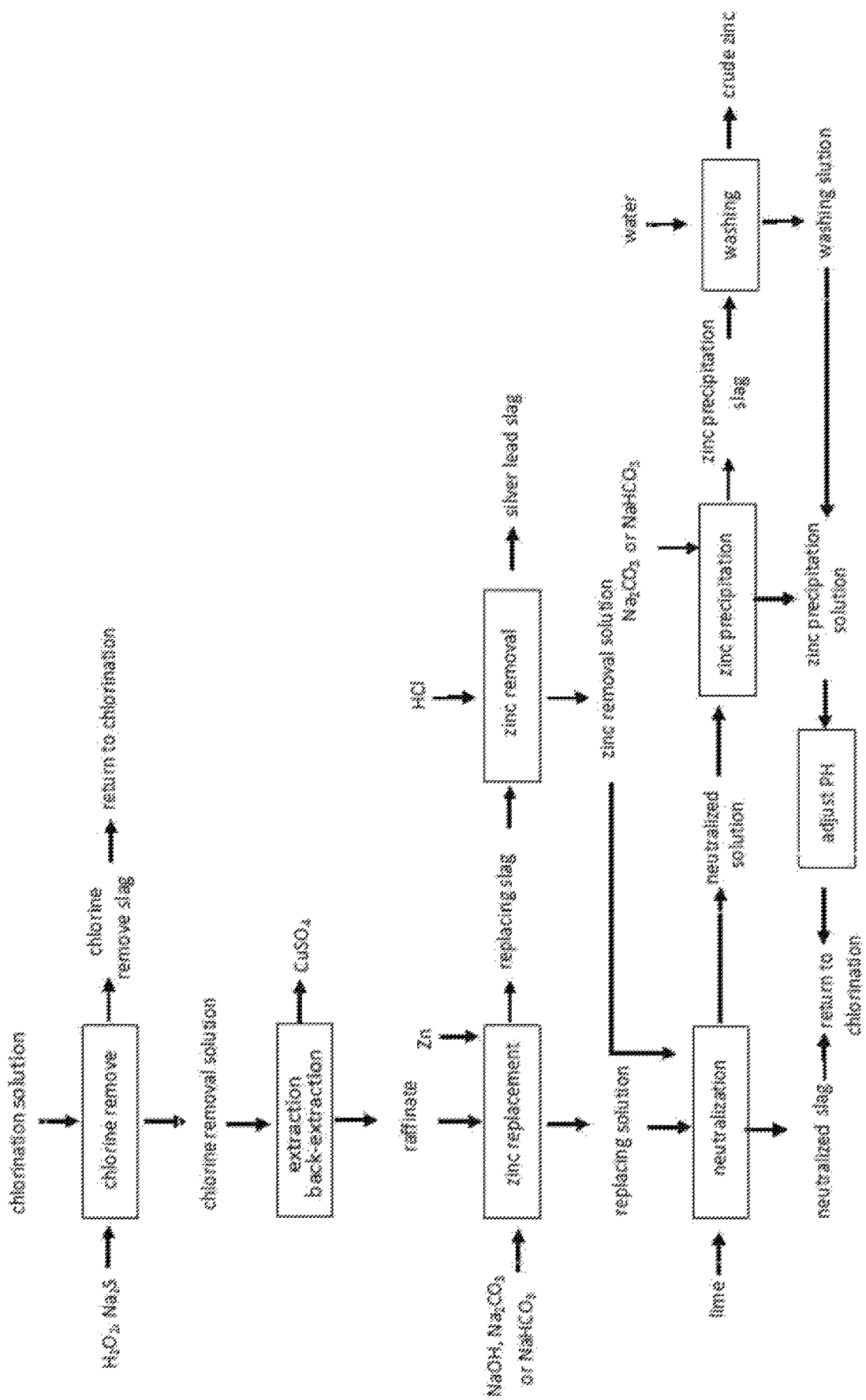
FIG. 3 shows a process of concentrating precious metals with chlorinated solution, according to one embodiment.
Figure 4:
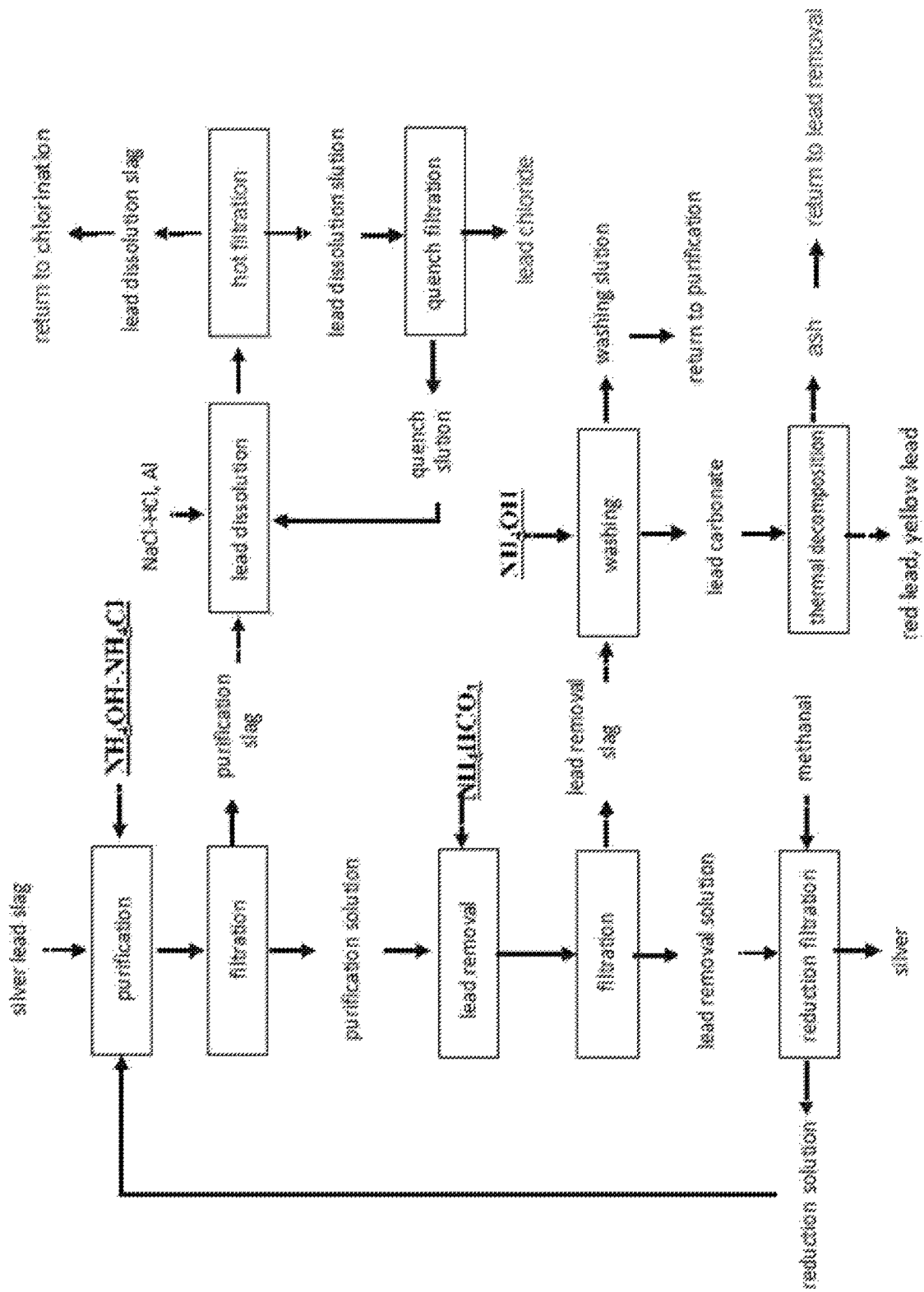
FIG. 4 shows the comprehensive recovery of silver-containing lead slag.

Recycling were performed according of the following steps:

Alkali leaching: PCB Incineration ash was subjected to a processes of alkali leaching, the alkali leaching solution was made of a mixture of sodium hydroxide and ammonia, wherein the concentration of sodium hydroxide was 5% by mass, and the concentration of ammonia was 5% by mass, the solid-liquid ratio of ash to the leaching solution was 1:5 Kg/L, the leaching temperature was 35° C.; blowing air with agitation, the blast air volume per cubic meter leaching solution was 0.01 m$^3$/min, After leaching for 1 hour, stop blowing the air and continue agitating, 1 g copper powder was added into every liter of the leaching solution, and the reaction was carried out for 10 minutes before filtration, after filtration a mixed alkali leaching slag and a mixed alkali leaching solution were obtained;

(2) Cu extraction back-extraction: the mixed alkali leaching solution obtained in step (1) was extracted with Benzaldehyde, 2-hydroxy-5-nonul-, oxime for copper extraction, copper sulfate and raffinate were obtained by back extraction with sulfuric acid solution;

(3) Neutralization-precipitation: sulfuric acid was added to the raffinate in step (2) for neutralization and precipitation, the terminal pH value of precipitation being 6, to obtain a precipitated slag and a precipitated solution;

(4) Bromine evaporative crystallization: bromine salts and crystal mother liquor were obtained by bromine evaporative crystallization of the precipitated solution in step (3);

(5) Regeneration: the crystal mother liquor in step (4) was regenerated by adding lime and adjusting pH to 11 to obtain gypsum and post-regeneration solution. The gypsum was put away to be treated concertedly, and the post-regeneration solution was returned to the alkali leaching process to form part of the alkali leaching solution;

(6) Acid pickling: the precipitated slag in step (3) was acid washed with sulfuric acid until the acid washing solution had a pH of 1 to obtain Lead sulfate and acid pickling solution;

(7) Zn evaporative crystallization: zinc sulfate and crystallized solution were obtained by Zn evaporative crystallization of the acid pickling solution in step (6), the crystallized solution was returned to the acid pickling process as part of the acid washing solution;

(8) Removal of Zn and Cu: the mixed alkali leaching slag in step (1) was used to remove zinc and copper, the leaching solution was 100 g/L sulfuric acid solution, the leaching temperature was 55° C. and the leaching time was 1 hour, hydrogen peroxide was added during leaching, and the mass of hydrogen peroxide added to per liter of the leaching solution was 40 g/L. Copper/zinc removal residual and copper/zinc removal filtrate were obtained. Separating copper and zinc from the copper/zinc removal filtrate to obtain copper sulfate and zinc sulfate, The copper/zinc removal residual was used for the enrichment of precious metals and recovery of valuable metals, according to the following processes.

Precious Metals Enrichment with a Chlorinated Solution:

Adding hydrogen peroxide to a chlorinated solution until no bubbles were produced, removing chlorine gas from the chlorinated solution by agitation, adjusting the pH of the chlorinated solution to 1.5 with sodium sulfide and filtering the chlorinated solution, and slags from the filtering were returned to the chlorination process; copper was extracted from the raffinate by a copper specific extractant, copper in raffinate was 0.08 g/L; controlling the raffinate at pH=0.5 with sodium hydroxide, 1 g of zinc powder was added to each liter of the raffinate, after 0.5 h agitation, filtering the reaction mix to obtain a displaced filtrate and post-displacement solution; the displaced filtrate was washed with 1 mol/L hydrochloric acid to obtain Zinc removal solution and precious slag; the zinc removal solution was combined with the post-displacement solution, the mixture was neutralized with lime to achieve a pH of 4, stirring for 0.5 h to obtain neutralizing slag and neutralizing filtrate, the neutralization slag was returned to the chlorination process; neutralizing the neutralizing filtrate with sodium carbonate until pH=8, stirring for 0.5 h and precipitating to obtain Zinc precipitation slag and post Zinc precipitation solution; washing the Zinc precipitation slag with water to obtain crude Zinc, the washing water was combined with the post Zinc precipitation solution, adjusting the pH of the combined mix with hydrochloric acid, and returning the combined mix to chlorination process.

Comprehensive Recovery of Silver-Containing Lead Slag:

(1) Impurity removal: silver-containing lead slag was added to ammonia-ammonium chloride solution, incubated and stirred, and filtered to obtain impurity removal residue and impurity removal solution, wherein the composition of the ammonia-ammonium chloride solution was as follows: 5% ammonia by mass, 200 g/L ammonium chloride, the solution-solid ratio of the ammonia-ammonium chloride solution and silver-containing lead slag is 5:1 Kg/L, the incubation temperature was 30° C. and the reaction time was 2 hours;

(2) Lead removal: ammonium bicarbonate was added to the impurity removal solution obtained in step (1), and the mix was filtered to yield lead removal residue and lead removal solution, wherein the ammonium bicarbonate was saturated solution at room temperature, and the terminal point was when no precipitation was produced;

(3) Reduction filtration: formaldehyde was added to the lead removal solution obtained in step (2) for silver reduction, formaldehyde: silver (molar ratio)=1:4, silver powder and post-reduction solution were obtained by filtering the mix, the post-reduction solution was returned to step (1) for impurity removal;

(4) Lead dissolving: the impurity removal residue obtained in step (1) was added to sodium chloride-hydrochloric acid solution, lead powder was added for lead dissolving, the composition of sodium chloride-hydrochloric acid was as follows: the concentration of sodium chloride was 200 g/L, the solution had a pH of 0, the solution-solid ratio of sodium chloride-hydrochloric acid solution to the impurity removal residue was 20:1 Kg/L, reaction temperature was 65° C. and the reaction time was 1 hour, in the reaction process the pH of the reaction solution was always kept to 0, the amount of lead powder added was 0.5 g/L;

(5) Hot filtration: the lead washing solution obtained in step (4) was filtered directly to yield dissolved lead residue and dissolved lead solution. The dissolved lead residue was returned to the chlorination process for trichlorination recovery;

(6) Quench filtration: the dissolved lead solution obtained in step (5) was quenched to room temperature and filtered to obtain lead chloride and quench solution, the quench solution was returned to step (4) for lead dissolving;

(7) Washing: the lead removal residue obtained in step (2) was washed with ammonia water until the washing solution contained no silver, lead carbonate was obtained by the washing process, the washing solution wash returned to step (1) impurity removal;

(8) Thermal decomposition: the lead carbonate obtained in step (7) was thermally decomposed to yield red lead products, the decomposition temperature was 450° C. and the decomposition time was 1 hour. The flue gas generated by the thermal decomposition was returned to step (2) for the lead removal treatment.

Recovery rate of Bromine salt was 95.1%, copper recovery rate was 98.3%, lead recovery rate was 99.2%, Zn recovery rate was 97.8%, and precious metals recovery rate was 98.5%.

Embodiment 2

Recycling were performed according of the following steps:

Alkali leaching: PCB Incineration ash was subjected to a processes of alkali leaching, the alkali leaching solution was made of a mixture of sodium hydroxide and ammonia, wherein the concentration of sodium hydroxide was 20% by mass, and the concentration of ammonia was 20% by mass, the solid-liquid ratio of ash to the leaching solution was 1:10 Kg/L, the leaching temperature was 55° C.; blowing air with agitation, the blast air volume per cubic meter leaching solution was 0.1 $m^3$/min, After leaching for 2 hours, stop blowing the air and continue agitating, 3 g copper powder was added into every liter of the leaching solution, and the reaction was carried out for 30 minutes before filtration, after filtration a mixed alkali leaching slag and a mixed alkali leaching solution were obtained;

(2) Cu extraction back-extraction: the mixed alkali leaching solution obtained in step (1) was extracted with Benzaldehyde, 2-hydroxy-5-nonul-,oxime for copper extraction, copper sulfate and raffinate were obtained by back extraction with sulfuric acid solution;

(3) Neutralization-precipitation: sulfuric acid was added to the raffinate in step (2) for neutralization and precipitation, the terminal pH value of precipitation being 7, to obtain a precipitated slag and a precipitated solution;

(4) Bromine evaporative crystallization: bromine salts and crystal mother liquor were obtained by bromine evaporative crystallization of the precipitated solution in step (3);

(5) Regeneration: the crystal mother liquor in step (4) was regenerated by adding lime and adjusting pH to 12 to obtain gypsum and post-regeneration solution. The gypsum was put away to be treated concertedly, and the post-regeneration solution was returned to the alkali leaching process to form part of the alkali leaching solution;

(6) Acid pickling: the precipitated slag in step (3) was acid washed with sulfuric acid until the acid washing solution had a pH of 3 to obtain Lead sulfate and acid pickling solution;

(7) Zn evaporative crystallization: zinc sulfate and crystallized solution were obtained by Zn evaporative crystallization of the acid pickling solution in step (6), the crystallized solution was returned to the acid pickling process as part of the acid washing solution;

(8) Removal of Zn and Cu: the mixed alkali leaching slag in step (1) was used to remove zinc and copper, the leaching solution was 200 g/L sulfuric acid solution, the leaching temperature was 75° C. and the leaching time was 3 hours, hydrogen peroxide was added during leaching, and the mass of hydrogen peroxide added to per liter of the leaching solution was 80 g/L. Copper/zinc removal residual and copper/zinc removal filtrate were obtained. Separating copper and zinc from the copper/zinc removal filtrate to obtain copper sulfate and zinc sulfate.

The copper/zinc removal residual was further used for the enrichment of precious metals according to the process of precious metals enrichment with a chlorinated solution in Embodiment 1, and was further used for recovery of valuable metals according to the comprehensive recovery of silver-containing lead slag in Embodiment 1.

Recovery rate of Bromine salt was 96.8%, copper recovery rate was 99.1%, lead recovery rate was 98.9%, Zn recovery rate was 98.2%, precious metals recovery rate was 98.8%.

Embodiment 3

Recycling were performed according of the following steps:

Alkali leaching: PCB Incineration ash was subjected to a processes of alkali leaching, the alkali leaching solution was made of a mixture of sodium hydroxide and ammonia, wherein the concentration of sodium hydroxide was 15% by mass, and the concentration of ammonia was 10% by mass, the solid-liquid ratio of ash to the leaching solution was 1:8 Kg/L, the leaching temperature was 40° C.; blowing air with agitation, the blast air volume per cubic meter leaching solution was 0.05 $m^3$/min, After leaching for 1.5 hours, stop blowing the air and continue agitating, 2 g copper powder was added into every liter of the leaching solution, and the reaction was carried out for 20 minutes before filtration, after filtration a mixed alkali leaching slag and a mixed alkali leaching solution were obtained;

(2) Cu extraction back-extraction: the mixed alkali leaching solution obtained in step (1) was extracted with Benzaldehyde, 2-hydroxy-5-nonul-,oxime for copper extraction, copper sulfate and raffinate were obtained by back extraction with sulfuric acid solution;

(3) Neutralization-precipitation: sulfuric acid was added to the raffinate in step (2) for neutralization and precipitation, the terminal pH value of precipitation being 6.5, to obtain a precipitated slag and a precipitated solution;

(4) Bromine evaporative crystallization: bromine salts and crystal mother liquor were obtained by Bromine evaporative crystallization of the precipitated solution in step (3);

(5) Regeneration: the crystal mother liquor in step (4) was regenerated by adding lime and adjusting pH to 11.5 to obtain gypsum and post-regeneration solution. The gypsum was put away to be treated concertedly, and the post-regeneration solution was returned to the alkali leaching process to form part of the alkali leaching solution;

(6) Acid pickling: the precipitated slag in step (3) was acid washed with sulfuric acid until the acid washing solution had a pH of 2 to obtain Lead sulfate and acid pickling solution;

(7) Zn evaporative crystallization: zinc sulfate and crystallized solution were obtained by Zn evaporative crystallization of the acid pickling solution in step (6), the crystallized solution was returned to the acid pickling process as part of the acid washing solution;

(8) Removal of Zn and Cu: the mixed alkali leaching slag in step (1) was used to remove zinc and copper, the leaching solution was 150 g/L sulfuric acid solution, the leaching temperature was 65° C. and the leaching time was 2 hours, hydrogen peroxide was added during leaching, and the mass of hydrogen peroxide added to per liter of the leaching solution was 60 g/L. Copper/zinc removal residual and copper/zinc removal filtrate were obtained. Separating copper and zinc from the copper/zinc removal filtrate to obtain copper sulfate and zinc sulfate.

The copper/zinc removal residual was further used for the enrichment of precious metals according to the process of precious metals enrichment with a chlorinated solution in Embodiment 1, and was further used for recovery of valuable metals according to the comprehensive recovery of silver-containing lead slag in Embodiment 1.

Recovery rate of Bromine salt was 97.1%, copper recovery rate was 98.8%, lead recovery rate was 99.3%, Zn recovery rate was 99.1%, precious metals recovery rate was 99.3%.

Embodiment 4

Recycling were performed according of the following steps:

Alkali leaching: PCB Incineration ash was subjected to a processes of alkali leaching, the alkali leaching solution was made of a mixture of sodium hydroxide and ammonia, wherein the concentration of sodium hydroxide was 10% by mass, and the concentration of ammonia was 15% by mass, the solid-liquid ratio of ash to the leaching solution was 1:6 Kg/L, the leaching temperature was 40° C.; blowing air with agitation, the blast air volume per cubic meter leaching solution was 0.02 m$^3$/min, After leaching for 1.5 hours, stop blowing the air and continue agitating, 1.8 g copper powder was added into every liter of the leaching solution, and the reaction was carried out for 25 minutes before filtration, after filtration a mixed alkali leaching slag and a mixed alkali leaching solution were obtained;

(2) Cu extraction back-extraction: the mixed alkali leaching solution obtained in step (1) was extracted with Benzaldehyde, 2-hydroxy-5-nonul-,oxime for copper extraction, copper sulfate and raffinate were obtained by back extraction with sulfuric acid solution;

(3) Neutralization-precipitation: sulfuric acid was added to the raffinate in step (2) for neutralization and precipitation, the terminal pH value of precipitation being 7, to obtain a precipitated slag and a precipitated solution;

(4) Bromine evaporative crystallization: bromine salts and crystal mother liquor were obtained by bromine evaporative crystallization of the precipitated solution in step (3);

(5) Regeneration: the crystal mother liquor in step (4) was regenerated by adding lime and adjusting pH to 11.3 to obtain gypsum and post-regeneration solution. The gypsum was put away to be treated concertedly, and the post-regeneration solution was returned to the alkali leaching process to form part of the alkali leaching solution;

(6) Acid pickling: the precipitated slag in step (3) was acid washed with sulfuric acid until the acid washing solution had a pH of 1.2 to obtain Lead sulfate and acid pickling solution;

(7) Zn evaporative crystallization: zinc sulfate and crystallized solution were obtained by Zn evaporative crystallization of the acid pickling solution in step (6), the crystallized solution was returned to the acid pickling process as part of the acid washing solution;

(8) Removal of Zn and Cu: the mixed alkali leaching slag in step (1) was used to remove zinc and copper, the leaching solution was 120 g/L sulfuric acid solution, the leaching temperature was 58° C. and the leaching time was 1.5 hours, hydrogen peroxide was added during leaching, and the mass of hydrogen peroxide added to per liter of the leaching solution was 55 g/L. Copper/zinc removal residual and copper/zinc removal filtrate were obtained. Separating copper and zinc from the copper/zinc removal filtrate to obtain copper sulfate and zinc sulfate.

The copper/zinc removal residual was further used for the enrichment of precious metals according to the process of precious metals enrichment with a chlorinated solution in Embodiment 1, and was further used for recovery of valuable metals according to the comprehensive recovery of silver-containing lead slag in Embodiment 1.

Recovery rate of Bromine salt was 98.1%, copper recovery rate was 99.5%, lead recovery rate was 98.6%, Zn recovery rate was 99.3%, precious metals recovery rate was 99.2%.

Embodiment 5

Recycling were performed according of the following steps:

Alkali leaching: PCB Incineration ash was subjected to a processes of alkali leaching, the alkali leaching solution was made of a mixture of sodium hydroxide and ammonia, wherein the concentration of sodium hydroxide was 18% by mass, and the concentration of ammonia was 7% by mass, the solid-liquid ratio of ash to the leaching solution was 1:9 Kg/L, the leaching temperature was 50° C.; blowing air with agitation, the blast air volume per cubic meter leaching solution was 0.07 m$^3$/min, After leaching for 1 hour, stop blowing the air and continue agitating, 2.5 g copper powder was added into every liter of the leaching solution, and the reaction was carried out for 18 minutes before filtration, after filtration a mixed alkali leaching slag and a mixed alkali leaching solution were obtained;

(2) Cu extraction back-extraction: the mixed alkali leaching solution obtained in step (1) was extracted with Benzaldehyde, 2-hydroxy-5-nonul-,oxime for copper extraction, copper sulfate and raffinate were obtained by back extraction with sulfuric acid solution;

(3) Neutralization-precipitation: sulfuric acid was added to the raffinate in step (2) for neutralization and precipitation, the terminal pH value of precipitation being 7, to obtain a precipitated slag and a precipitated solution;

(4) Bromine evaporative crystallization: bromine salts and crystal mother liquor were obtained by bromine evaporative crystallization of the precipitated solution in step (3);

(5) Regeneration: the crystal mother liquor in step (4) was regenerated by adding lime and adjusting pH to 11.8 to obtain gypsum and post-regeneration solution. The gypsum was put away to be treated concertedly, and the post-regeneration solution was returned to the alkali leaching process to form part of the alkali leaching solution;

(6) Acid pickling: the precipitated slag in step (3) was acid washed with sulfuric acid until the acid washing solution had a pH of 2.7 to obtain Lead sulfate and acid pickling solution;

(7) Zn evaporative crystallization: zinc sulfate and crystallized solution were obtained by Zn evaporative crystallization of the acid pickling solution in step (6), the crystallized solution was returned to the acid pickling process as part of the acid washing solution;

(8) Removal of Zn and Cu: the mixed alkali leaching slag in step (1) was used to remove zinc and copper, the leaching solution was 160 g/L sulfuric acid solution, the leaching temperature was 72° C. and the leaching time was 1.5 hours, hydrogen peroxide was added during leaching, and the mass of hydrogen peroxide added to per liter of the leaching solution was 58 g/L. Copper/zinc removal residual and copper/zinc removal filtrate were obtained. Separating copper and zinc from the copper/zinc removal filtrate to obtain copper sulfate and zinc sulfate.

The copper/zinc removal residual was further used for the enrichment of precious metals according to the process of precious metals enrichment with a chlorinated solution in Embodiment 1, and was further used for recovery of valuable metals according to the comprehensive recovery of silver-containing lead slag in Embodiment 1.

Recovery rate of Bromine salt was 98.1%, copper recovery rate was 99.3%, lead recovery rate was 99.2%, Zn recovery rate was 97.3%, precious metals recovery rate was 99.2%.

Embodiment 6

Recycling were performed according of the following steps:

Alkali leaching: PCB Incineration ash was subjected to a processes of alkali leaching, the alkali leaching solution was made of a mixture of sodium hydroxide and ammonia, wherein the concentration of sodium hydroxide was 9% by mass, and the concentration of ammonia was 16% by mass, the solid-liquid ratio of ash to the leaching solution was 1:6 Kg/L, the leaching temperature was 43° C.; blowing air with agitation, the blast air volume per cubic meter leaching solution was 0.04 m$^3$/min, After leaching for 1.5 hours, stop blowing the air and continue agitating, 3 g copper powder was added into every liter of the leaching solution, and the reaction was carried out for 30 minutes before filtration, after filtration a mixed alkali leaching slag and a mixed alkali leaching solution were obtained;

(2) Cu extraction back-extraction: the mixed alkali leaching solution obtained in step (1) was extracted with Benzaldehyde, 2-hydroxy-5-nonul-,oxime for copper extraction, copper sulfate and raffinate were obtained by back extraction with sulfuric acid solution;

(3) Neutralization-precipitation: sulfuric acid was added to the raffinate in step (2) for neutralization and precipitation, the terminal pH value of precipitation being 7, to obtain a precipitated slag and a precipitated solution;

(4) Bromine evaporative crystallization: bromine salts and crystal mother liquor were obtained by bromine evaporative crystallization of the precipitated solution in step (3);

(5) Regeneration: the crystal mother liquor in step (4) was regenerated by adding lime and adjusting pH to 12 to obtain gypsum and post-regeneration solution. The gypsum was put away to be treated concertedly, and the post-regeneration solution was returned to the alkali leaching process to form part of the alkali leaching solution;

(6) Acid pickling: the precipitated slag in step (3) was acid washed with sulfuric acid until the acid washing solution had a pH of 1 to obtain Lead sulfate and acid pickling solution;

(7) Zn evaporative crystallization: zinc sulfate and crystallized solution were obtained by Zn evaporative crystallization of the acid pickling solution in step (6), the crystallized solution was returned to the acid pickling process as part of the acid washing solution;

(8) Removal of Zn and Cu: the mixed alkali leaching slag in step (1) was used to remove zinc and copper, the leaching solution was 200 g/L sulfuric acid solution, the leaching temperature was 55° C. and the leaching time was 3 hours, hydrogen peroxide was added during leaching, and the mass of hydrogen peroxide added to per liter of the leaching solution was 40 g/L. Copper/zinc removal residual and copper/zinc removal filtrate were obtained. Separating copper and zinc from the copper/zinc removal filtrate to obtain copper sulfate and zinc sulfate.

The copper/zinc removal residual was further used for the enrichment of precious metals according to the process of precious metals enrichment with a chlorinated solution in Embodiment 1, and was further used for recovery of valuable metals according to the comprehensive recovery of silver-containing lead slag in Embodiment 1.

Recovery rate of Bromine salt was 95.9%, copper recovery rate was 98.3%, lead recovery rate was 97.6%, Zn recovery rate was 99.3%, precious metals recovery rate was 99.5%.

What is claimed is:

1. A method of pretreatment and bromine recovery of printed circuit board incineration ash, comprising the steps of:
    (1) alkali leaching, further comprising the steps of:
        treating the printed circuit board incineration ash with an alkali leaching solution for 1 to 2 hours, wherein the alkali leaching solution is made of a mixture of sodium hydroxide and ammonia, wherein the concentration of sodium hydroxide is 5~20% by mass, and the concentration of ammonia is 5~20% by mass, the solid-liquid ratio of ash to the leaching solution is 1:5~1:10 Kg/L, the leaching temperature is 35~55° C., meanwhile keep blowing air with agitation, wherein blast air volume per cubic meter of the leaching solution is 0.01~0.1 m3/min;
    stopping blowing the air and continuing agitating, adding 1~3 g copper powder into every liter of the leaching solution;
    carrying out the reaction for 10~30 minutes; and
    performing filtration to obtain a mixed alkali leaching slag and a mixed alkali leaching solution;
    (2) copper extraction back-extraction, further comprising the steps of:
        extracting copper from the mixed alkali leaching solution from step (1) with Benzaldehyde,2-hydroxy-5-nonyl-,oxime, and
        performing back-extraction with a sulfuric acid solution to obtain copper sulfate and raffinate;
    (3) neutralization-precipitation, further comprising the steps of:
        adding a sulfuric acid to the raffinate in step (2) for neutralization and precipitation, to obtain a precipitated slag and a precipitated solution;
    (4) bromine evaporative crystallization, further comprising the steps of:
        performing bromine evaporative crystallization for the precipitated solution in step (3), to obtain bromine salts and crystal mother liquor;
    (5) regeneration, further comprising the steps of:
        regenerating the crystal mother liquor in step (4) by adding lime, to obtain gypsum and post-regeneration solution;
    (6) acid pickling, further comprising the steps of:
        performing acid wash of the precipitated slag in step (3) with sulfuric acid to obtain lead sulfate and acid pickling solution;
    (7) zinc evaporative crystallization, further comprising the steps of:
        performing evaporative crystallization of the acid pickling solution in step (6), to obtain zinc sulfate and crystallized solution, wherein the crystallized solution is returned to the acid pickling process as part of the acid washing solution; and (8) zinc and copper removal, further comprising the steps of:
  removing zinc and copper from the mixed alkali leaching slag in step (1), by contacting the mixed alkali leaching slag with a leaching solution of 100~200 g/L sulfuric acid solution, the leaching temperature being 55~75° C. and the leaching time being 1~3 hours, and hydrogen peroxide being added during leaching, wherein the mass of hydrogen peroxide added to per liter of the leaching solution is 40~80 g/L;
  performing a filtration to obtain copper/zinc removal residual and copper/zinc removal filtrate; and
  separating the copper and the zinc from the copper/zinc removal filtrate to obtain copper sulfate and zinc sulfate, wherein the copper/zinc removal residual is used for enrichment of precious metals and recovery of valuable metals.

2. The method of pretreatment and bromine recovery of printed circuit board incineration ash according to claim 1, wherein during the step (5) the post-regeneration solution is returned to the alkali leaching process of step (1) to form part of the alkali leaching solution.

3. The method of pretreatment and bromine recovery of printed circuit board incineration ash according to claim 1, wherein in step (3) a terminal pH value of the precipitation is 6-7.

4. The method of pretreatment and bromine recovery of printed circuit board incineration ash according to claim 1, wherein the pH in the step (5) regeneration is adjusted to 11-12.

5. The method of pretreatment and bromine recovery of printed circuit board incineration ash according to claim 1, wherein in step (6) the precipitated slag is was acid washed with sulfuric acid until the washing solution had a pH of 1-3.

6. The method of pretreatment and bromine recovery of printed circuit board incineration ash according to claim 1, wherein in step (7), the crystallized solution is returned to the acid pickling process as part of the acid washing solution.

* * * * *